US010616150B2

(12) United States Patent
Faulkner et al.

(10) Patent No.: US 10,616,150 B2
(45) Date of Patent: Apr. 7, 2020

(54) INDICATION OF COMMUNICATION ACROSS APPLICATIONS

(71) Applicant: Microsoft Technology Licensing, LLC, Redmond, WA (US)

(72) Inventors: Jason Thomas Faulkner, Seattle, WA (US); Casey James Baker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/048,793

(22) Filed: Jul. 30, 2018

(65) Prior Publication Data

US 2018/0337874 A1    Nov. 22, 2018

Related U.S. Application Data

(63) Continuation of application No. 15/606,283, filed on May 26, 2017, now abandoned.

(60) Provisional application No. 62/415,900, filed on Nov. 1, 2016.

(51) Int. Cl.
  *H04M 3/42* (2006.01)
  *H04L 12/58* (2006.01)
  *H04L 12/18* (2006.01)

(52) U.S. Cl.
  CPC .......... *H04L 51/04* (2013.01); *H04L 12/1818* (2013.01)

(58) Field of Classification Search
  CPC ........................... H04L 51/04; H04L 12/1818
  USPC .................................. 455/416, 412.1, 412.2
  See application file for complete search history.

(56) References Cited

U.S. PATENT DOCUMENTS

| | | | |
|---|---|---|---|
| 7,231,205 B2 | 6/2007 | Guyot et al. | |
| 7,346,654 B1 | 3/2008 | Weiss | |
| 7,466,810 B1 | 12/2008 | Quon et al. | |
| 7,503,006 B2 | 3/2009 | Danieli | |
| 7,653,691 B2 | 1/2010 | Lasensky et al. | |
| 7,996,463 B2 | 8/2011 | Mousseau et al. | |
| 8,351,903 B2 | 1/2013 | Sigmund et al. | |
| 8,385,964 B2 * | 2/2013 | Haney ..................... | H04W 4/21 455/519 |
| 8,402,378 B2 | 3/2013 | Blattner et al. | |
| 8,571,194 B2 | 10/2013 | Turner | |
| 8,576,750 B1 * | 11/2013 | Hecht ..................... | H04M 3/56 370/261 |
| 8,660,849 B2 | 2/2014 | Gruber et al. | |

(Continued)

OTHER PUBLICATIONS

"Final Office Action Issued in U.S. Appl. No. 15/606,283", dated Apr. 4, 2019, 26 Pages.

(Continued)

*Primary Examiner* — Marceau Milord
(74) *Attorney, Agent, or Firm* — NovoTechIP International PLLC

(57) ABSTRACT

Techniques for indication of communication across applications are described. According to various implementations, a graphical user interface (GUI) for a first application is presented. The GUI for the first application, for instance, enables a first user to communicate with a second user via the first application. An indication of communication between the first user and the second user via a second application is presented within the GUI for the first application. In at least one implementation, the first application and the second application enable communication via different respective modalities.

20 Claims, 13 Drawing Sheets

(56) References Cited

U.S. PATENT DOCUMENTS

| | | |
|---|---|---|
| 8,751,592 B2 | 6/2014 | Garcia et al. |
| 8,872,880 B1 | 10/2014 | Matselyukh et al. |
| 8,886,153 B2 | 11/2014 | Velusamy et al. |
| 8,954,100 B2 | 2/2015 | Toksvig et al. |
| 8,964,533 B2 | 2/2015 | Moore et al. |
| 8,989,818 B2 | 3/2015 | Tal et al. |
| 9,111,105 B2 * | 8/2015 | Barton .................... H04L 41/00 |
| 9,407,621 B2 | 8/2016 | Vakil et al. |
| 9,462,132 B2 | 10/2016 | Caulfield et al. |
| 9,467,412 B2 | 10/2016 | Shapiro et al. |
| 9,736,298 B2 | 8/2017 | Lam et al. |
| 9,769,317 B2 | 9/2017 | Albert et al. |
| 9,774,571 B2 | 9/2017 | Krantz et al. |
| 10,097,973 B2 * | 10/2018 | Gross .................... H04W 4/025 |
| 2004/0001446 A1 | 1/2004 | Bhatia et al. |
| 2004/0013254 A1 | 1/2004 | Hamberg et al. |
| 2005/0094621 A1 | 5/2005 | Acharya et al. |
| 2005/0286536 A1 | 12/2005 | Steinheider et al. |
| 2008/0253547 A1 | 10/2008 | Berndt et al. |
| 2010/0145861 A1 * | 6/2010 | Law .................... G06Q 20/102 705/76 |
| 2010/0246571 A1 | 9/2010 | Geppert et al. |
| 2011/0202956 A1 * | 8/2011 | Connelly ............. H04N 21/433 725/38 |
| 2011/0268262 A1 | 11/2011 | Jones et al. |
| 2012/0128146 A1 | 5/2012 | Boss et al. |
| 2013/0257876 A1 | 10/2013 | Davis |
| 2013/0258040 A1 | 10/2013 | Kaytaz et al. |
| 2014/0066035 A1 | 3/2014 | Melin |
| 2014/0270129 A1 | 9/2014 | Bracken et al. |
| 2014/0323110 A1 | 10/2014 | Moon et al. |
| 2014/0325395 A1 | 10/2014 | Itakura |
| 2015/0140978 A1 | 5/2015 | Zilmer et al. |
| 2015/0222677 A1 | 8/2015 | Couse et al. |
| 2015/0350451 A1 | 12/2015 | Aue et al. |
| 2016/0073056 A1 | 3/2016 | Katzman et al. |
| 2016/0094716 A1 * | 3/2016 | Caulfield ................ H04M 3/56 455/416 |
| 2016/0360336 A1 * | 12/2016 | Gross .................... H04W 4/025 |
| 2016/0381699 A1 | 12/2016 | Rubin et al. |
| 2017/0324785 A1 * | 11/2017 | Taine .................. H04L 65/1069 |
| 2018/0032997 A1 * | 2/2018 | Gordon ............. G06Q 20/3224 |

OTHER PUBLICATIONS

"Non Final Office Action Issued in U.S. Appl. No. 15/606,283", dated Oct. 2, 2018, 25 Pages.

Colburn, et al., "Graphical Enhancements for Voice Only Conference Calls", In Technical Report MSR-TR-2001-95, Oct. 1, 2001, 9 pages.

* cited by examiner

INDICATION OF COMMUNICATION ACROSS APPLICATIONS

RELATED APPLICATIONS

This application is a continuation of and claims priority to U.S. application Ser. No. 15/606,283, titled "Notification of a Communication Session in a Different User Experience," which in turn claims priority under 35 U.S.C. 119(e) to U.S. Provisional Application No. 62/415,900, filed Nov. 1, 2016 and titled "Audio Icon for a Communication Session," the entire disclosures of which are hereby incorporated by reference herein.

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for indication of communication across applications are described. According to various implementations, a graphical user interface (GUI) for a first application is presented. The GUI for the first application, for instance, enables a first user to communicate with a second user via the first application. An indication of communication between the first user and the second user via a second application is presented within the GUI for the first application. In at least one implementation, the first application and the second application enable communication via different respective modalities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
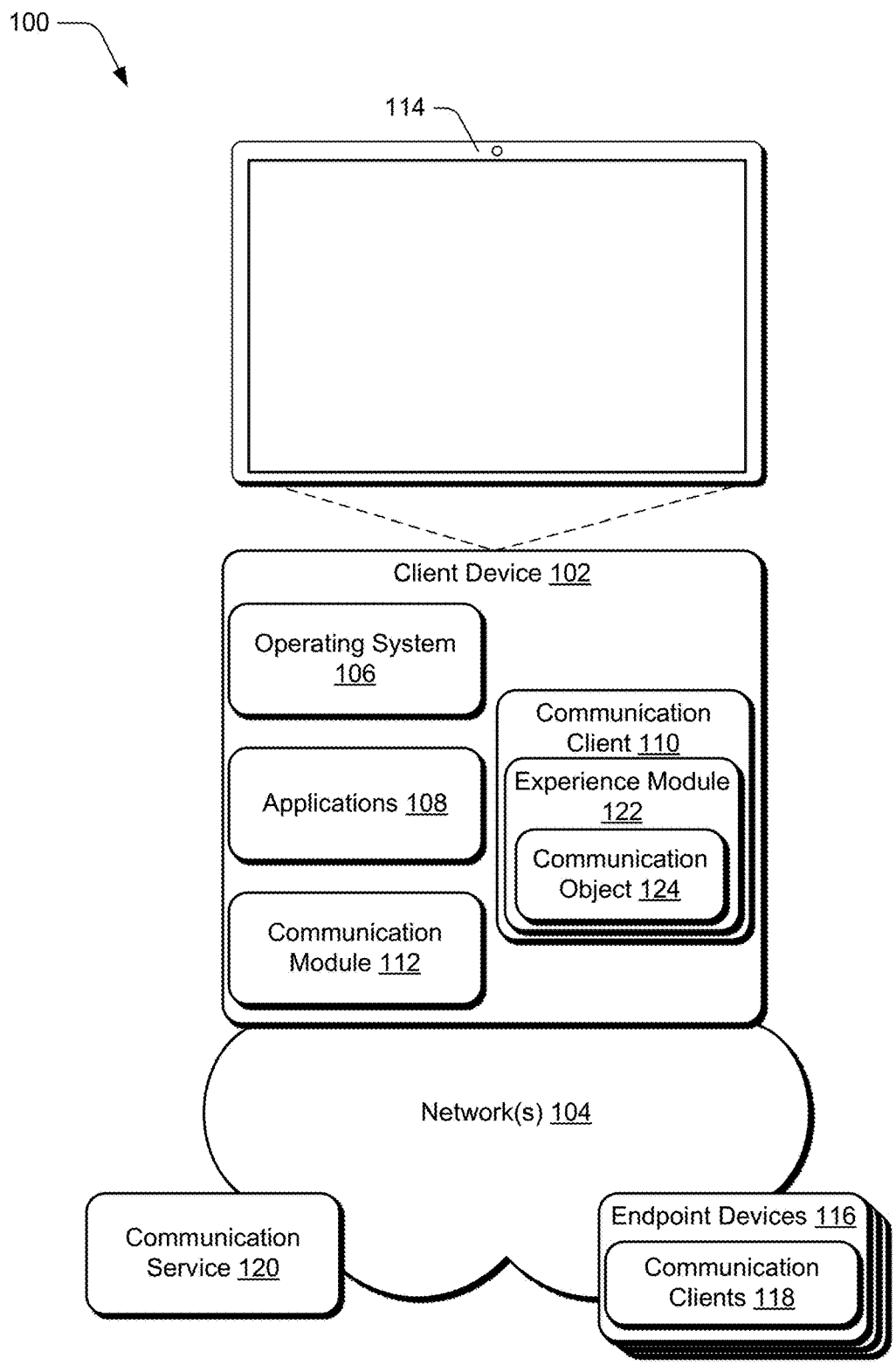
FIG. 1 is an illustration of an environment in an example implementation that is operable to employ techniques discussed herein.

Techniques for indication of communication across applications in a different user experience are described. A communication session, for instance, refers to a real-time exchange of communication media between different communication endpoints. Examples of a communication session include a Voice over Internet Protocol (VoIP) call, a video call, text messaging, a file transfer, content sharing, and/or combinations thereof. In at least one implementation, a communication session represents a Unified Communication and Collaboration (UC&C) session.

According to various implementations, a notification of an active communication session can be presented in a user experience that is not directly involved in the communication session. Consider, for example, that a particular user is interacting with an application, such as a productivity application, within an application graphical user interface (GUI) for the application. A session notification is presented within the application GUI indicating that a communication session that involves other users is occurring. At this point, the particular user is not a participant in the communication session, but is made aware of the communication session via the session notification. Generally, the term "participant" refers to a user that is joined to a communication session and whose interaction functionality is enabled such that the user can contribute communication media to the communication session, such as voice, video, content, and so forth.

Continuing with this example, the session notification includes selectable functionality for enabling the particular user to join the communication session. Thus, the particular user interacts with the session notification to join as a participant in the communication session. According to various implementations, the particular user can participate in the communication session while continuing to interact with the application in the application GUI. For instance, the session notification is updated to indicate that the particular user is now a participant in the communication session, and the particular user can participate in the communication session while remaining in the context of the application GUI.

In at least some implementations, the session notification represents a portable object that can be embedded and surfaced across a variety of different user experiences, such as different application GUIs. Further, the session notification can be generated with a consistent visual appearance and functionality in a variety of different user experiences. In this way, a consistent user interaction model is provided that enables users to view status for communication sessions and initiate participation in communication sessions within the context of user experiences that may not be involved in the communication sessions.

Having presented an overview of example implementations in accordance with one or more implementations, consider now an example environment in which example implementations may by employed.

FIG. 1 is an illustration of an environment 100 in an example implementation that is operable to employ techniques for notification of a communication session in a different user experience described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), combinations thereof, and so forth.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client device 102 includes a variety of different functionalities that enable various activities and tasks to be performed. For instance, the client device 102 includes an operating system 106, applications 108, a communication client 110, and a communication module 112. Generally, the operating system 106 is representative of functionality for abstracting various system components of the client device 102, such as hardware, kernel-level modules and services, and so forth. The operating system 106, for instance, can abstract various components of the client device 102 to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110 is representative of functionality to enable different forms of communication via the client device 102. Examples of the communication client 110 include a voice communication application (e.g., a VoIP client), a video communication application, a messaging application, a content sharing application, a unified communication & collaboration (UC&C) application, and combinations thereof. The communication client 110, for instance, enables different communication modalities to be combined to provide diverse communication scenarios.

The communication module 112 is representative of functionality for enabling the client device 102 to communicate data over wired and/or wireless connections. For instance, the communication module 112 represents hardware and logic for data communication via a variety of different wired and/or wireless technologies and protocols.

The client device 102 further includes a display device 114, which represents functionality for visual output for the client device 102. Additionally, the display device 114 represents functionality for receiving various types of input, such as touch input, pen input, and so forth.

The environment 100 further includes endpoint devices 116, which are representative of devices and/or functionalities with which the client device 102 may communicate. In at least some implementations, the endpoint devices 116 represent end-user devices such as discussed with reference to the client device 102. The endpoint devices 116 include communication clients 118, which are representative of functionalities to enable different forms of communication via the endpoint devices 116. The communication clients 118, for example, represent different instances of the communication client 110. For purposes of discussion herein, reference is made to an endpoint device 116 and a communication client 118, which represent instances of the endpoint devices 116 and the communication clients 118, respectively.

In at least some implementations, the communication clients 110, 118 represent interfaces to a communication service 120. Generally, the communication service 120 is representative of a service to perform various tasks for management of communication between the client device 102 and the endpoint device 116. The communication service 120, for instance, can manage initiation, moderation, and termination of communication sessions between the communication clients 110, 118.

The communication service 120 maintains a presence across many different networks and can be implemented according to a variety of different architectures, such as a cloud-based service, a distributed service, a web-based service, and so forth. Examples of the communication service 120 include a VoIP service, an online conferencing service, a UC&C service, and so forth.

The communication client 110 an experience module 122 which is representative of functionality for performing various aspects of notification of a communication session in a different user experience described herein. According to various implementations, the experience module 122 is configured to cause indications of communication sessions to be presented across different user experiences. The experience module 122, for instance, utilizes a communication object 124 to expose indications of communications in different user experiences, such as within different instances of the applications 108. For example, the experience module 122 can interface with an application 108 and embed the communication object 124 within an instance of the application 108. As further detailed below, a user can interact with the communication object 124 via a visual session notification to enable the user to interface with an associated communication session, such as to enable the user to participate in the communication session and/or to access content associated with the communication session.

Having described an example environment in which the techniques described herein may operate, consider now a discussion of some example implementation scenarios for notification of a communication session in a different user experience in accordance with one or more implementations. The implementation scenarios may be implemented in the environment 100 discussed above and/or any suitable environment.

Figure 2A:
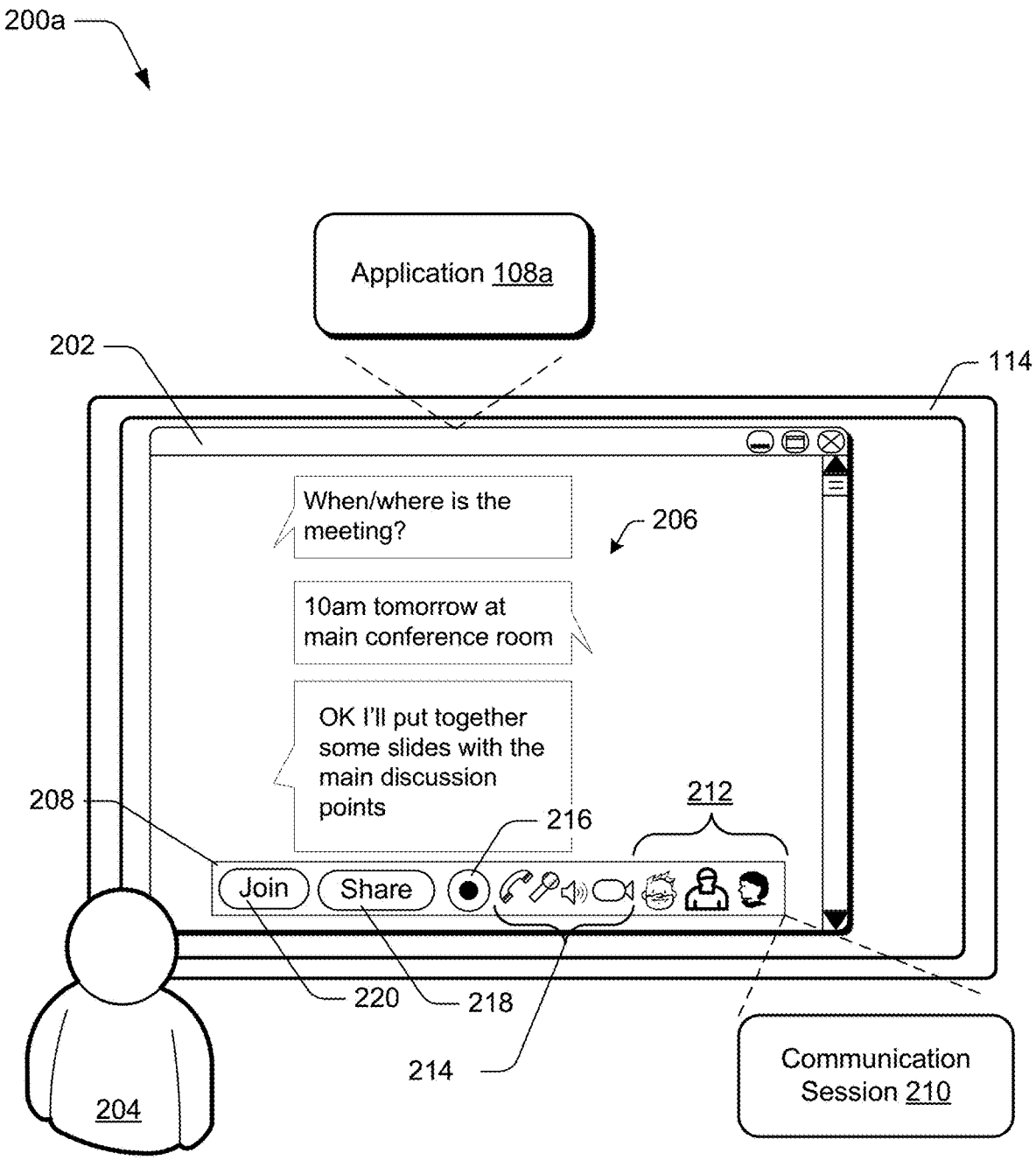
FIG. 2a illustrates an example implementation scenario for providing a notification of a communication session in accordance with one or more implementations.

FIG. 2a depicts an implementation scenario 200a for providing a notification of a communication session in accordance with one or more implementations. The scenario 200a includes an application graphical user interface (GUI) 202 for an application 108a and displayed on the display device 114. Generally, the application 108a represents an instance of the applications 108 and is executing on the client device 102. In this particular example, the application 108a represents a chat application and in which a user 204 is engaged in a chat conversation with other users. The application GUI 202, for instance, includes chat content 206 that represents portions of a chat conversation.

While the chat conversation is in progress, a session notification 208 is presented in the lower portion of the application GUI 202. Generally, the session notification 208 indicates that users other than the user 204 are engaged in a communication session 210. The session notification 208, for instance, is populated with user visualizations 212 for different users who are participants in the communication session 210. The session notification 208 can be presented in response to various events, such as initiation of the communication session 210, the user 204 opening the application 108a, the user authenticating with the client device 102, and so forth. Alternatively, the session notification 208 can be presented as a persistent notification displayed on the display device 114.

In at least some implementations, the session notification 208 is presented by the communication client 110. For instance, the session notification 208 is a visual representation of the communication object 124 that can be embedded in various user experiences, such as different instances of the applications 108. Thus, the application 108a can present the application GUI 202 to enable the user 204 to interact with the application 108a, and the communication client 110 can embed the session notification 208 within the application GUI 202 to enable the user 204 to view a status of the communication session 210 and to take various actions in relation to the communication session 210. The application 108a and the communication client 110, for instance, represent two different and distinct applications that execute independently of one another but that can interact to surface the session notification 208, such as via the communication object 124.

In this particular implementation, the user 204 is not currently a participant in the communication session 210. Communication media of the communication session 210, for instance, is not accessible to the client device 102. Thus, the user 204 is provided with a visual indication that the communication session 210 is occurring, but communication media of the communication session 210 is prevented from being accessed via the client device 102 while the user 204 is not a participant.

In at least some implementations, the users represented by the user visualizations 212 represent users that share a relationship with the user 204, such as users in a contacts list of the user 204, users within a user group that includes the user 204, users with which the user 204 has communicated previously, and so forth. In at least one implementation, the users represented by the user visualizations 212 represent one or more users with which the user 204 is text chatting via the application GUI 202. The text chat, for instance, is separate from the communication session 210. In at least some implementations, the communication session 210 is managed by the communication client 110, i.e., an application that is separate and independent from the application 108a.

The session notification 208 further includes a media control 214, a recording indicator 216, a share control 218, and a join control 220. The media control 214 generally identifies media types that are included in the communication session 210. In this particular example, the media control 214 includes an audio indicator and a video indicator, which provide a visual indication that the communication session 210 includes an exchange of both audio and video media.

The recording indicator 216 provides a visual indication of a recording status of the communication session 210. For instance, presence of the recording indicator 216 indicates that the communication session 210 is being recorded, such as by one of the current participants in the communication session. Alternatively or additionally, the recording indicator 216 can have different respective visual appearances based on whether the communication session 210 is being recorded. In at least some implementations, the user 204 can select the recording indicator 216 to cause the communication session 210 to be recorded locally on the client device 102, even though the user 204 is not currently a participant in the communication session. Whether or not the user 204 is permitted to record the communication session 210, however, may be dependent on permission settings for the communication session 210.

The share control 218 represents a visual indicator that is selectable to enable different types of content to be shared with the users involved in the communication session 210. The user 204, for instance, can select the share control 218 to enable the user 204 to share content with the users involved in the communication session 210. In at least some implementations, the user 204 can share content with the users involved in the communication session 210 and without the user 204 being an actual participant in the communication session 210. Shared content, for instance, can be communicated via a service that is managing the communication session 210, e.g., the communication service 120.

The join control 220 is a visual indicator that is selectable to initiate a join action to enable the user 204 to join the communication session 210. For instance, in response to selecting the join control 220, the user 204 is added as a participant in the communication session 210 such that communication media of the communication session 210 is accessible to the client device 102, and the user 204 can exchange communication media (e.g., voice, video, and so forth) with other users participating in the communication session 210. In at least some implementations, the user 204 can be automatically joined to the communication session 210 in response to selecting the join control 220. Alternatively, selecting the join control 220 can cause a join request to be sent to a particular user already involved in the communication session 210. If the particular user provides input indicating permission to join, the user 204 can be joined to the communication session 210. However, if the particular user declines the join request, the user 204 may be denied permission to join the communication session 210.

Figure 2B:
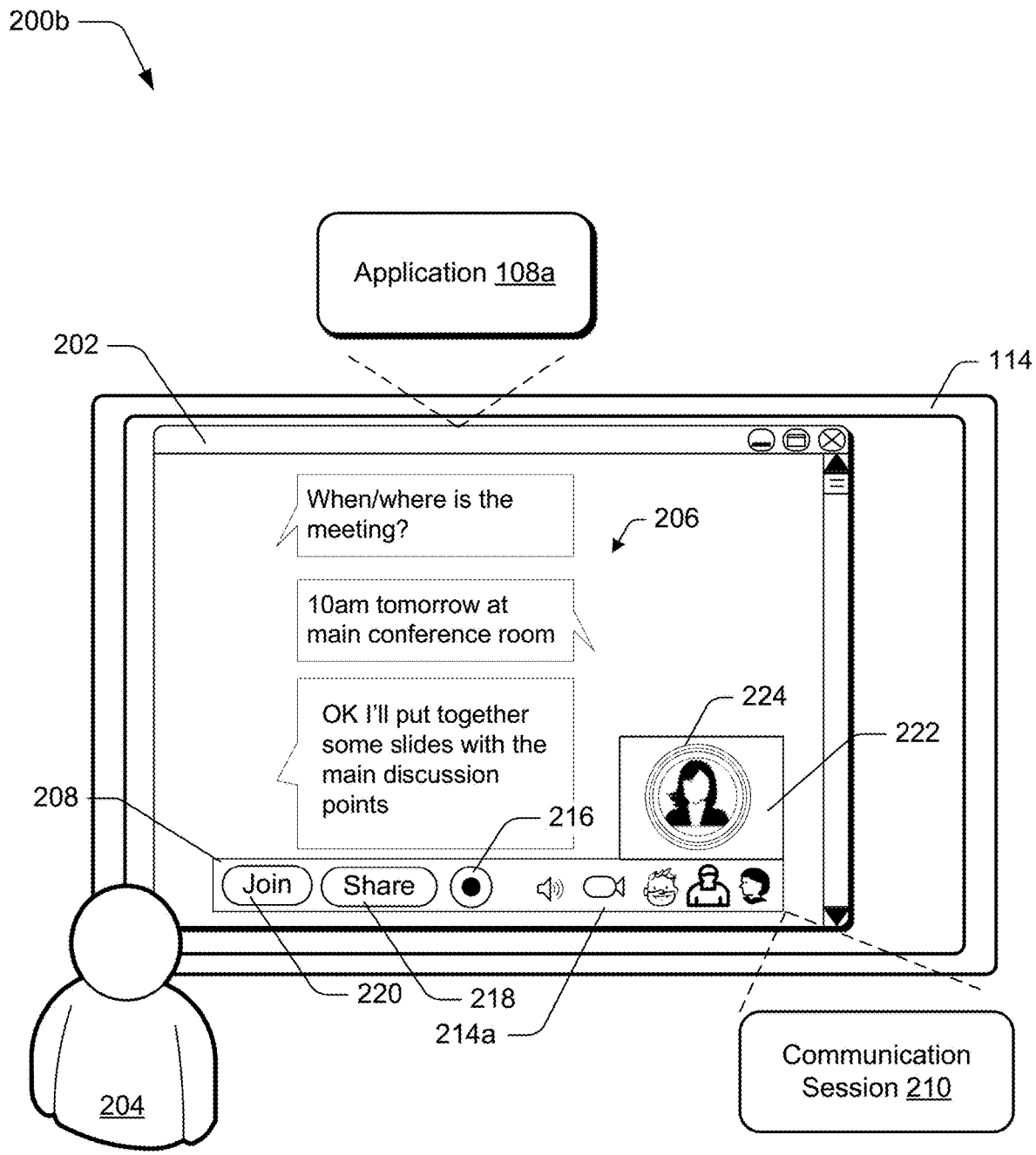
FIG. 2b illustrates an example implementation scenario for providing content as part of a notification of a communication session in accordance with one or more implementations.

FIG. 2b depicts an implementation scenario 200b for providing content as part of a notification of a communication session in accordance with one or more implementations. The scenario 200b, for instance, represents a continuation and/or variation of the scenario 200a.

In the scenario 200b, the session notification 208 includes a monitor region 222 that can be populated with various types of content from the communication session 210. The monitor region 222, for instance, can be presented even though the user 204 is not currently a participant in the communication session 210. In this particular example, the monitor region 222 includes a user representation 224, which is a visual representation of a participant in the communication session 210. The user representation 224, for instance, represents a user that is currently speaking and/or a user that is determined to be most active (e.g., speaking the most) during the communication session 210. Thus, in this implementation, the user 204 can view via the monitor region 222 an indication of a user who is active in the communication session 210, even though the user 204 is not a participant in the communication session 210.

Generally, the monitor region 222 can be presented in various ways. For instance, the monitor region 222 can be presented by default as part of the session notification 208. Alternatively or additionally, the user 204 can switch the monitor region 222 on or off, such as by selecting a video control 214a of the media control 214.

Figure 2C:
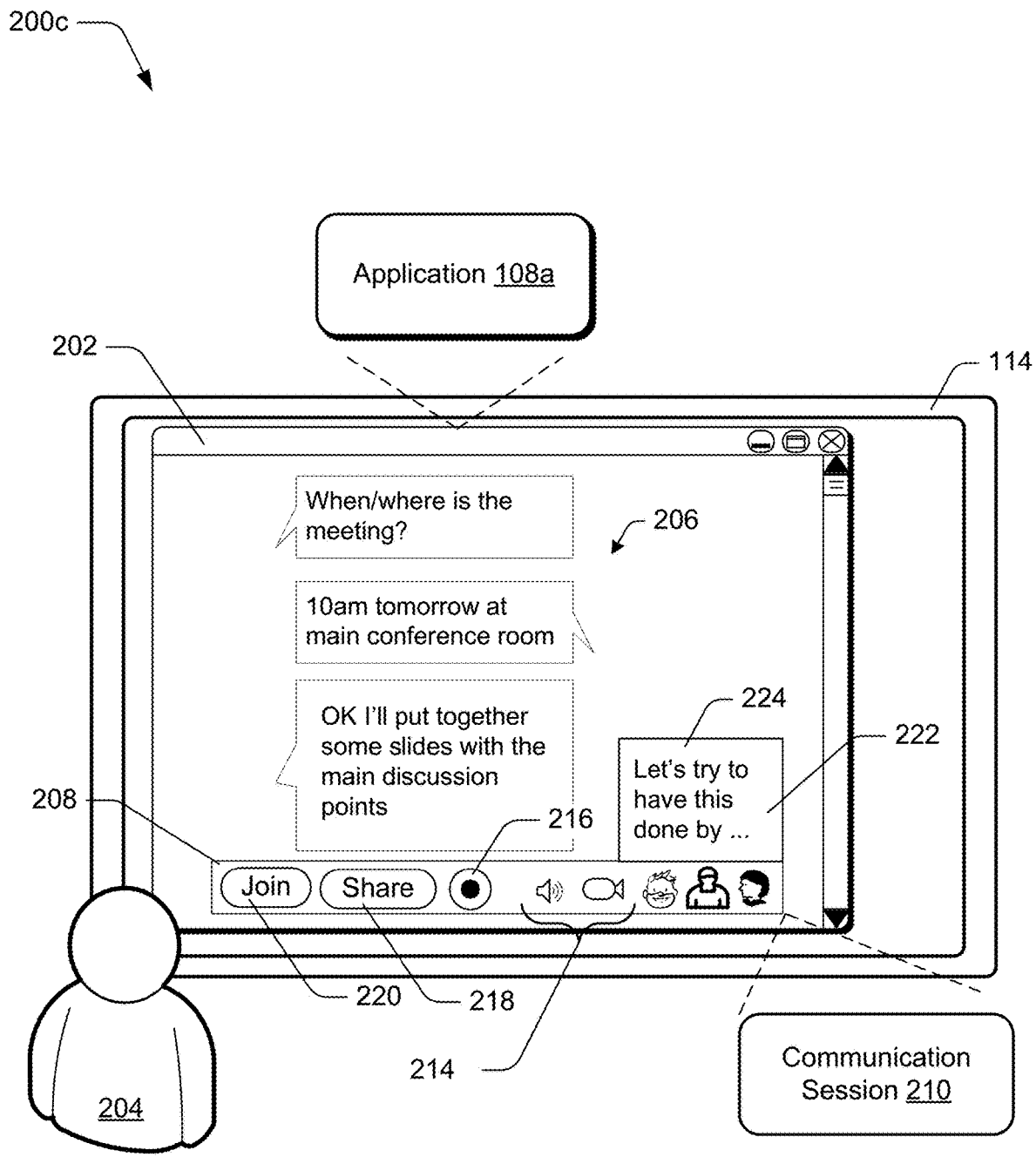
FIG. 2c illustrates an example implementation scenario for providing content as part of a notification of a communication session in accordance with one or more implementations.

FIG. 2c depicts an implementation scenario 200c for providing content as part of a notification of a communication session in accordance with one or more implementations. The scenario 200c, for instance, represents a continuation and/or variation of the scenarios 200a, 200b.

In the scenario 200c, the monitor region 222 is populated with text content 226 from the communication session 210. The text content 226, for instance, represents text provided by one of the participants in the communication session 210. In at least one implementations, the text content 226 represents text that is automatically transcribed (e.g., by the communication client 110) from speech audio from a participant in the communication session 210. Thus, the monitor region 222 is populated with content from the communication session 210, even though the user 204 is not currently a participant in the communication session 210.

In at least one implementation, the text content 226 can be presented in response to the user 204 muting audio of the communication session 210. For instance, the user 204 can select an audio control 214b, which causes audio media of the communication session 210 to be muted at the client device 102. Accordingly, in response, audio of the communication session 210 is transcribed into the text content 226 and displayed in the monitor region 222.

While the scenario 200c shows text content 226 in the monitor region 222, a variety of other types of content can be presented in the monitor region 222, such as files, graphics, video content, interactive content, and so forth. The monitor region 222, for instance, is populated with content shared by a participant in the communication session 210.

Figure 2D:
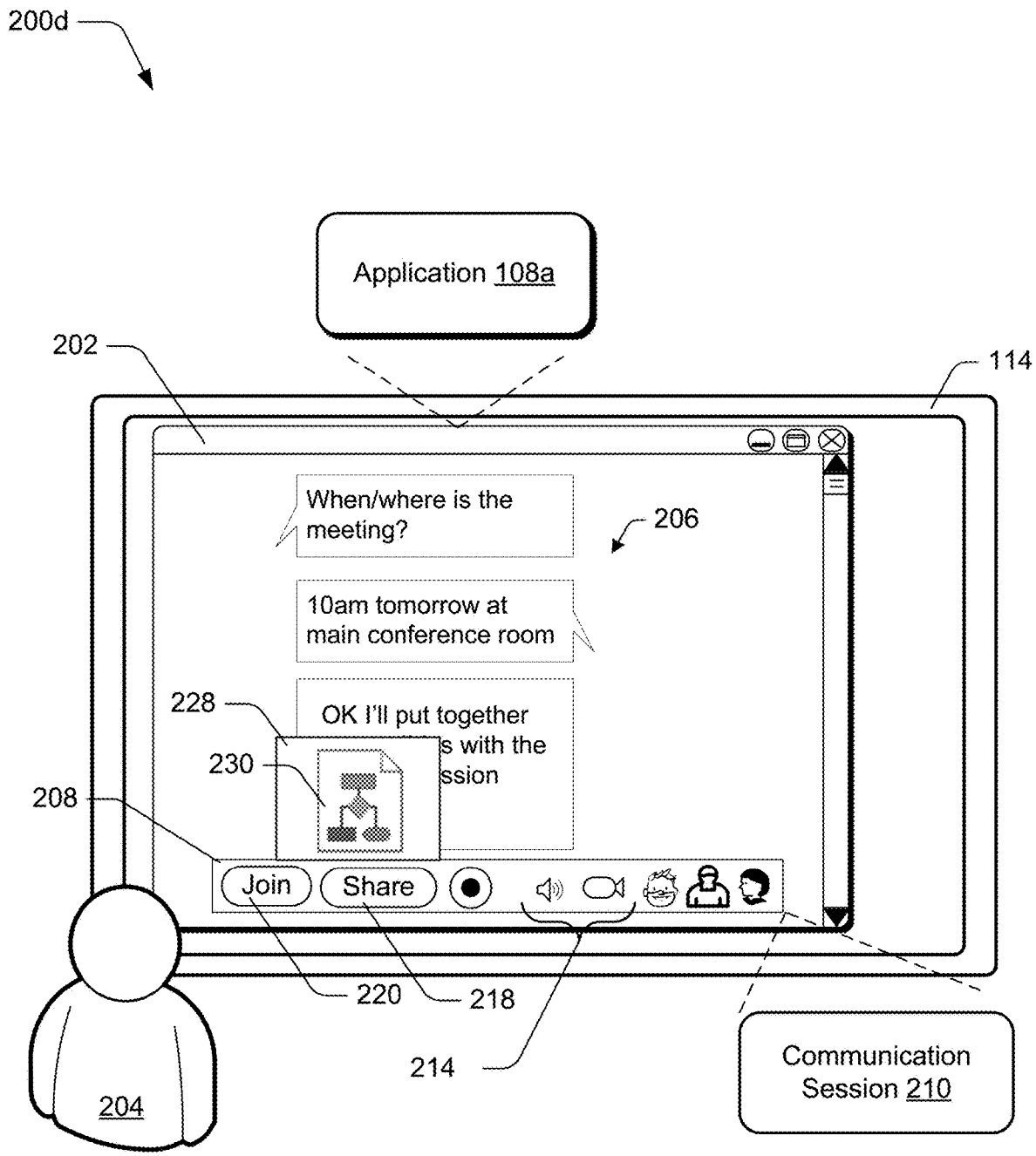
FIG. 2d illustrates an example implementation scenario for enabling a non-participant user to share content to a communication session in accordance with one or more implementations.

FIG. 2d depicts an implementation scenario 200d for enabling a non-participant user to share content to a communication session in accordance with one or more implementations. The scenario 200d, for instance, represents a continuation and/or variation of the scenarios 200a-220c.

In the scenario 200d, the user 204 selects the share control 218, which causes a share region 228 to be presented. Generally, the share region 228 represents a portion of the session notification 208 via which the user 204 can share content with participants in the communication session 210, even though the user 204 is not a participant in the communication session. Various types of content can be shared via the share region 228, such as text content (e.g., text messages), graphics, files, and so forth.

In this particular example, the user 204 has populated a content item 230 to the share region 228. This causes the content item 230 to be communicated to participants in the communication session 210 that are remote from the client device 102, such as to be displayed via graphical interfaces viewed by the participants. Thus, the communication object 124 and the session notification 208 provide a variety of ways for a non-participant user to view session status and session content for a communication session.

Thus, the scenarios 200a-200c depict that different types of information and content pertaining to a communication session can be presented to a user who is not a participant in the communication session. For instance, in at least one implementation, a non-participant user can view an indication that a communication session is occurring, but the non-participant user is not permitted to access media content of the communication session. In a different implementation, a non-participant user is permitted to access certain types of content pertaining to a communication session, such as based on permission settings that specify whether a non-participant user can access the content, and/or what types of content a non-participant user is permitted to access.

Further to the scenario 200d, the user 204 selects the join control 220. If the user is able/permitted to join, the user 204 is added as a participant in the communication session 210. Consider, for example, the following scenarios.

Figure 3A:
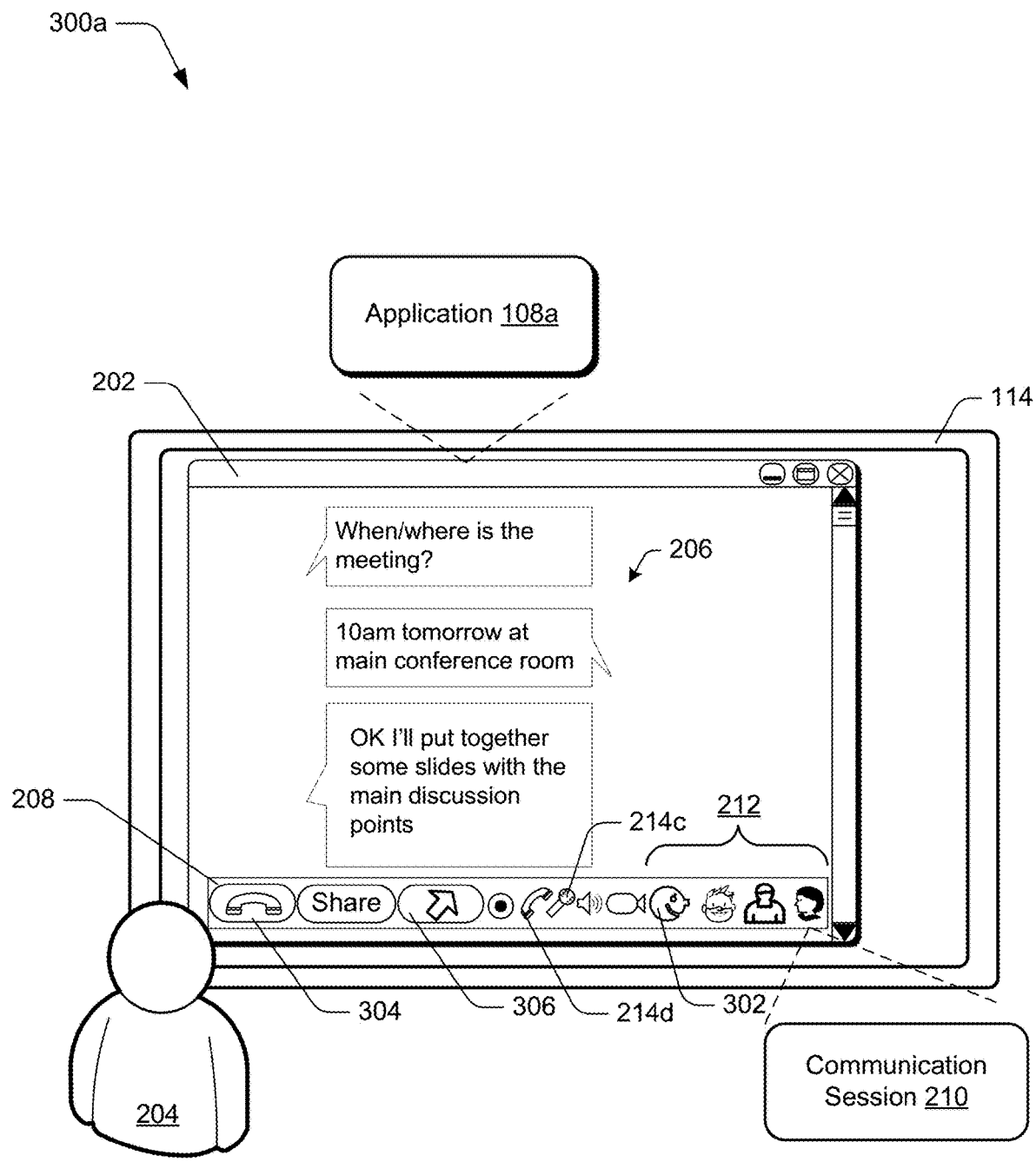
FIG. 3a illustrates an example implementation scenario for enabling a user to participate in a communication session in accordance with one or more implementations.

FIG. 3a depicts an example implementation scenario 300a for enabling a user to participate in a communication session in accordance with one or more implementations. The scenario 300a, for example, represents a continuation of the scenarios 200a-200d described above.

In the scenario 300a, the user 204 has joined as a participant in the communication session 210 from within the context of the application 108a, such as described above. Accordingly, the session notification 208 is updated to include a user visualization 302 that represents the user 204 and indicates that the user 204 is a participant in the communication session 210. The user visualizations 212, for instance, are updated to include the user visualization 302.

Thus, the user 204 may exchange communication media with other participants in the communication session 210, such as voice media, video media, and so forth. Further, the user 204 may participate in the communication session 210 from within the context of the application 108a. For instance, the user 204 may continue with the chat conversation 206 within the application GUI 202 with one set of users, while participating in the communication session 210 with a different set of users. In at least some implementations, the chat conversation within the application GUI 202 and the communication session 210 may include one or more common participants other than the user 204, but may still represent separate and distinct data flows implemented and managed by different applications. The communication session 210, for instance, is managed by the communication client 110.

As part of joining the user 204 to the communication session 210, a disconnect control 304 is presented within the session notification 208. Generally, the disconnect control 304 is selectable to disconnect the user 204 from the communication session 210, e.g., to remove the user 204 as a participant in the communication session 210.

The session notification 208 also includes a launch control 306, which is selectable to cause a separate GUI to be presented for participation in the communication session 210. For instance, selecting the launch control 306 causes a GUI specific to the communication session 210 to be presented, such as to overlay and/or replace the application GUI 202.

The session notification 208 further includes a microphone control 214d and a phone control 214e. Generally, the microphone control 214d is selectable to turn a local microphone on or off, such as to mute and unmute audio input to the client device 102. The phone control 214e is selectable to enable the user 204 to join the communication session 210 via another device, such as a local phone. For instance, selecting the phone control 214e causes a local phone to be connected to the communication session 210 such that the user 204 can participate in the communication session 210 via the local phone.

Figure 3B:
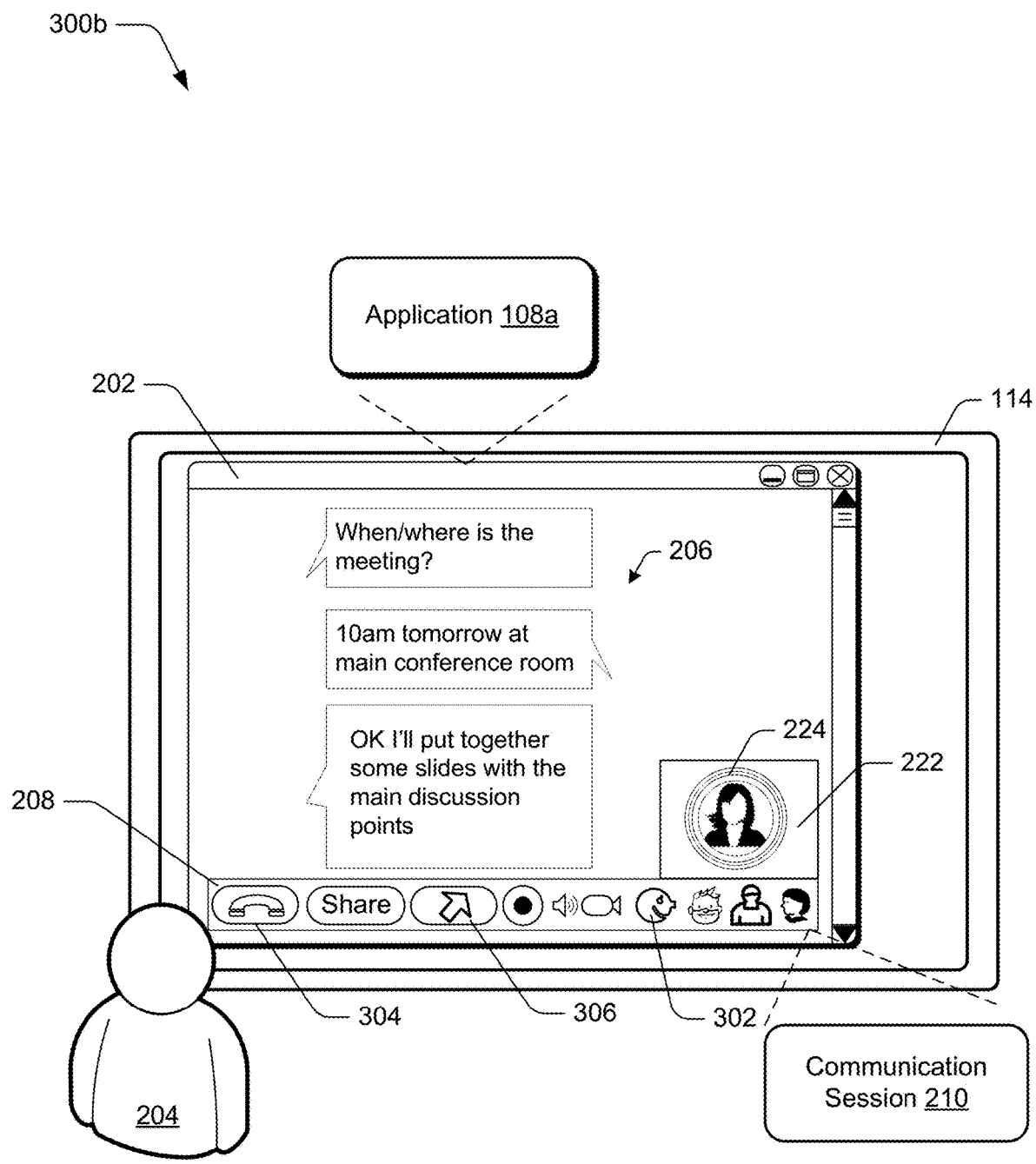
FIG. 3b illustrates an example implementation scenario for user participation in a communication session in accordance with one or more implementations.

FIG. 3b depicts an example implementation scenario 300b for user participation in a communication session in accordance with one or more implementations. The scenario 300b, for example, represents a continuation of the scenario 300a described above.

In the scenario 300b, the user 204 has joined the communication session 210, such as described above. Further, the monitor region 222 is presented as part of the session notification 208. As described above, the monitor region 222 can be populated with various content pertaining to the communication session 210, such as visual representations of a participant, shared content, text transcribed from voice audio, and so forth.

In this particular example, the monitor region 222 includes the user representation 224. The user representation 224, for instance, represents a user that is currently speaking and/or a user that is determined to be most active (e.g., speaking the most) during the communication session 210. Thus, in this implementation, the user 204 can view via the monitor region 222 an indication of a user who is active in the communication session 210.

Figure 3C:
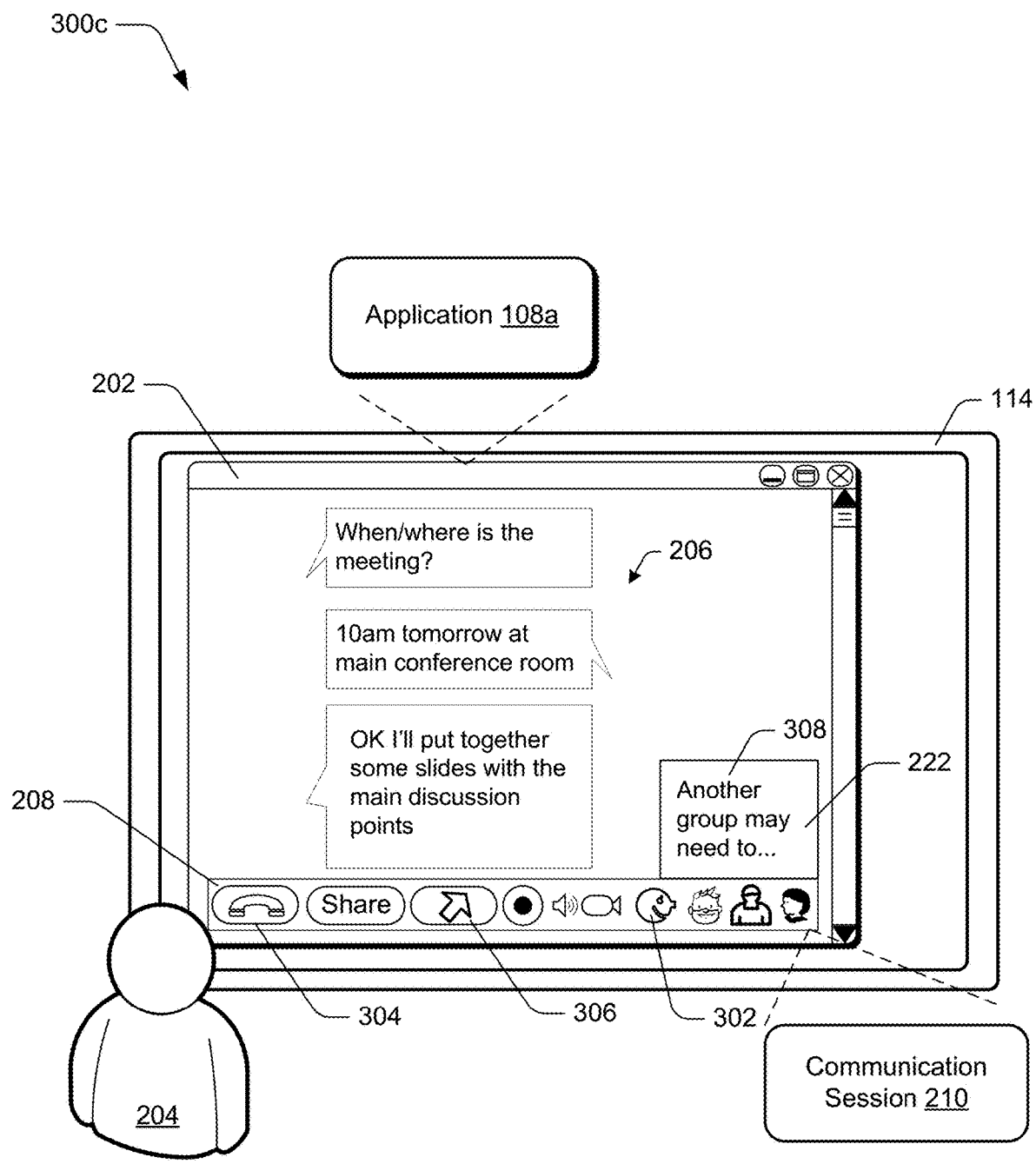
FIG. 3c illustrates an example implementation scenario for displaying content as part of a notification of a communication session in accordance with one or more implementations.

FIG. 3c depicts an implementation scenario 300c for displaying content as part of a notification of a communication session in accordance with one or more implementations. The scenario 300c, for instance, represents a continuation and/or variation of the scenarios 300a, 300b.

In the scenario 300c, the monitor region 222 is populated with text content 308 from the communication session 210. The text content 308, for instance, represents text provided by one of the participants in the communication session 210. In at least one implementations, the text content 308 represents text that is automatically transcribed (e.g., by the communication client 110) from speech audio from a participant in the communication session 210.

While the scenario 200c shows text content 308 in the monitor region 222, a variety of other types of content can be presented in the monitor region 222, such as files, graphics, video content, interactive content, and so forth. The monitor region 222, for instance, is populated with content shared by a participant in the communication session 210, such as the user 204 and/or other participant.

Figure 3D:
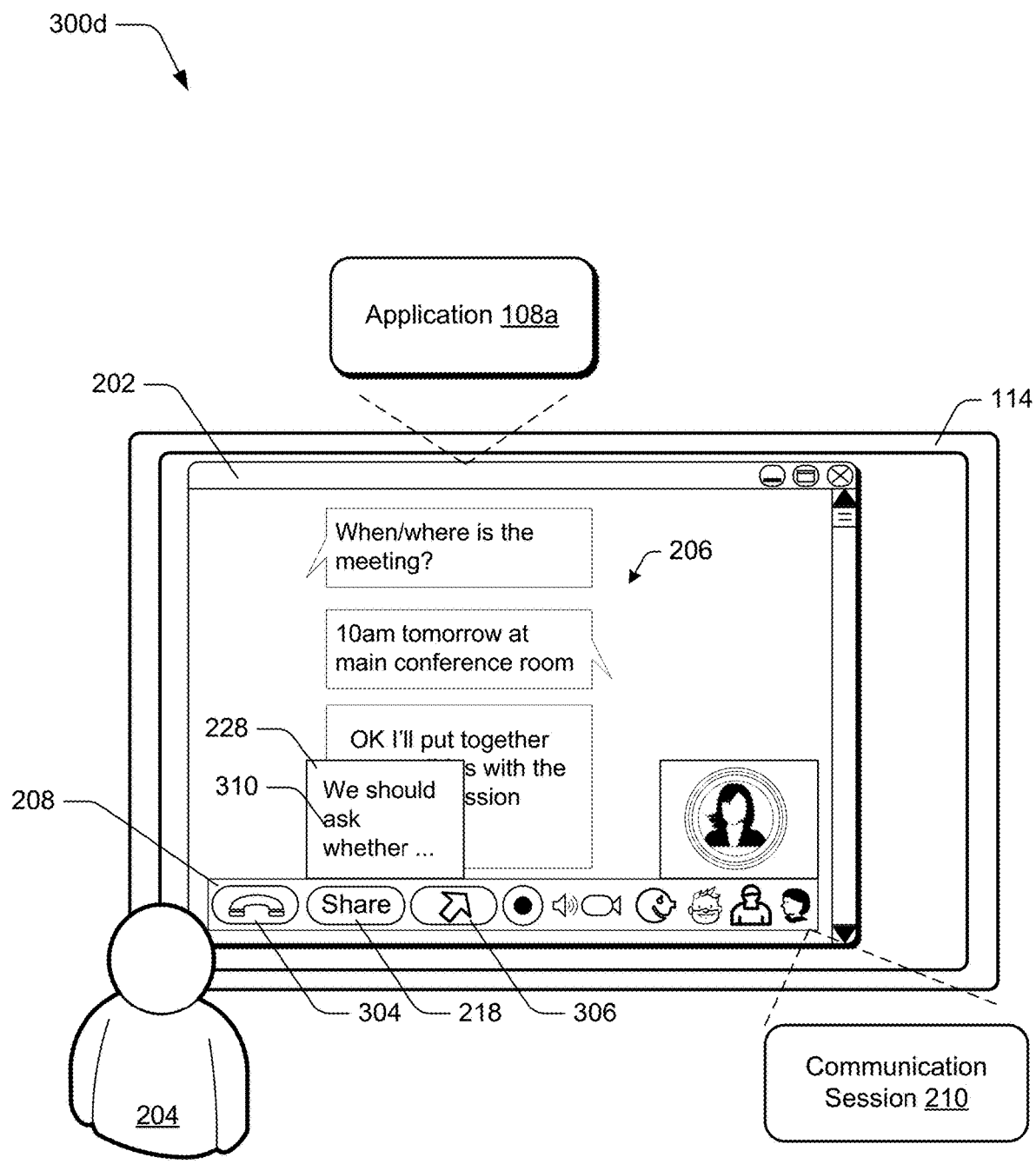
FIG. 3d illustrates an example implementation scenario for enabling a participant to share content to a communication session in accordance with one or more implementations.

FIG. 3d depicts an implementation scenario 300d for enabling a participant to share content to a communication session in accordance with one or more implementations. The scenario 300d, for instance, represents a continuation and/or variation of the scenarios 300a-300c.

In the scenario 300d, the user 204 is a participant in the communication session 210, and selects the share control 216, which causes the share region 228 to be presented. As mentioned above, various types of content can be shared via the share region 228, such as text content (e.g., text messages), graphics, files, and so forth.

In this particular example, the user 204 has entered text content 310 into the share region 228. This causes the text content 310 to be communicated to other participants in the communication session 210, such as to be displayed via graphical interfaces viewed by the participants.

Thus, as described in the scenarios above, the communication object 124 and the session notification 208 provide a variety of ways for a non-participant user and a participant user to view session status and session content for a communication session. Further, the session notification 208 can be configured in a variety of ways to provide different types of combinations of information pertaining to a communication session.

Generally, the session notification 208 can be displayed relative to the application GUI 202 in a variety of ways. For instance, the session notification 208 can be docked in position such that if the application GUI 202 is scrolled, the session notification 208 remains in place and does not scroll with the application GUI 202. Alternatively or additionally, the session notification 208 is movable such that the user 204 can drag the session notification 208 to different regions of the application GUI 202 and/or the display device 114.

Further to the scenario 300d, the user 204 selects the launch control 306, which causes a transition from the session notification 208 to an expanded user experience for the communication session 210. Consider, for example, the following scenario.

Figure 4:
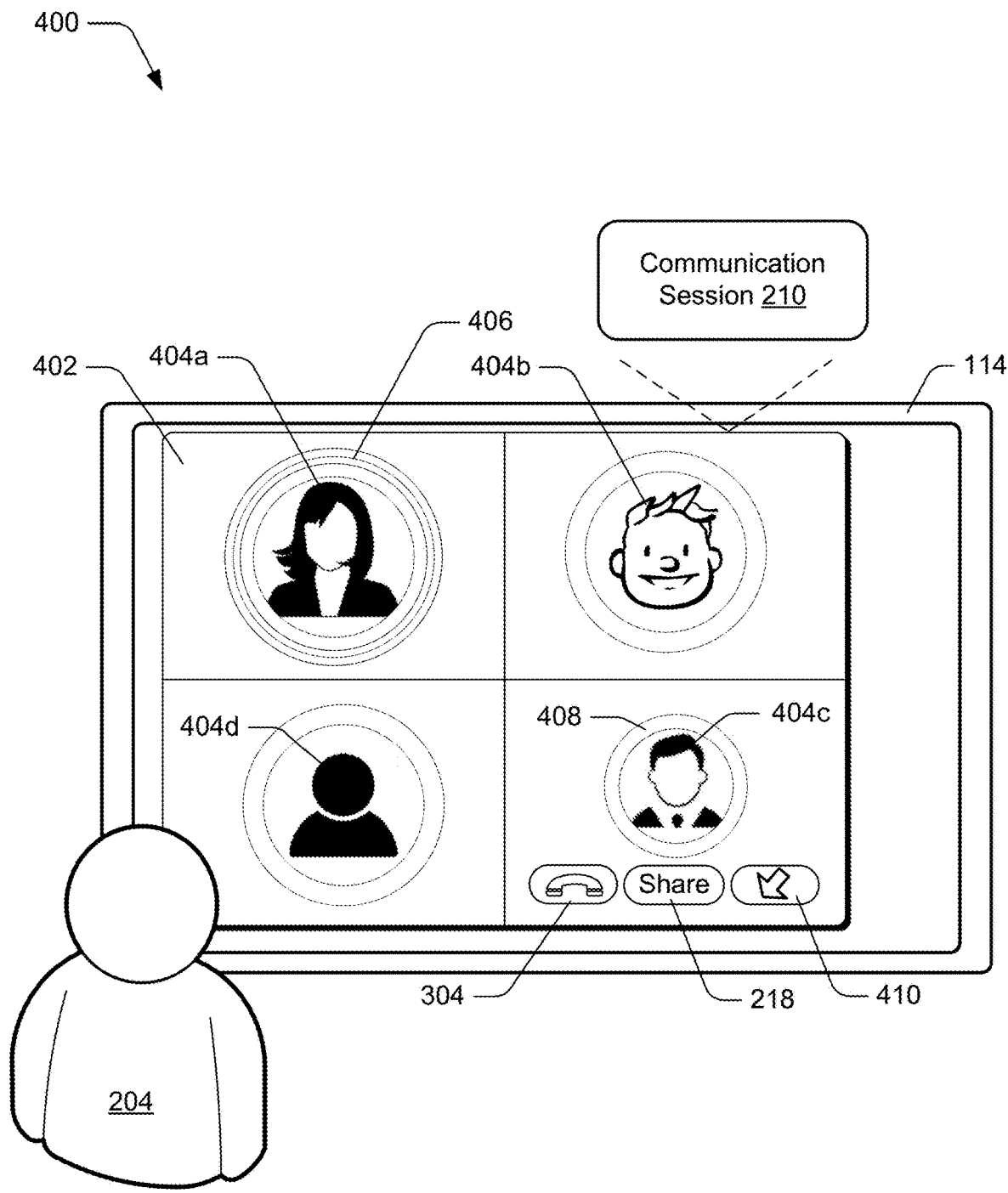
FIG. 4 illustrates an example implementation scenario for participating in a communication session in accordance with one or more implementations.

FIG. 4 depicts an example implementation scenario 400 for participating in a communication session in accordance with one or more implementations. The scenario 400 generally represents a continuation and/or variation of the scenarios described above.

The scenario 400 includes a communication GUI 402 that can be used to participate in the communication session 210. The communication GUI 402, for instance, represents a GUI for the communication client 110. Generally, the communication GUI 402 can be presented in response to different events, such as the user 204 joining the communication session 210, the user 204 selecting the launch control 306 from the session notification 208, and so forth. In this particular example, the communication GUI shows that for different users are participating in the communication session 210, as represented by a user representation 404a, a user representation 404b, a user representation 404c, and a user representation 404d. In this particular implementation, the user representation 404c represents the user 204, and the user representations 404*a*, 404*b*, and 404*d* represent participants in the communication session 210 that are remote from the user 204.

Generally, the user representations 404*a*-404*d* may be configured in various ways. For instance, the user representations 404*a*-404*c* include live video captured at locations of the respective users. The user representation 404*d*, however, includes a static image (e.g., an icon) that represents a respective user. The user represented by the user representation 404*d*, for instance, does not have an active video camera or does not wish to allow live video of the user to be captured and presented as part of the communication session 210.

According to various implementations, the user representations 404*a*-404*d* can be animated in various ways to reflect voice activity from the respective users. For instance, in this particular example, the user represented by the user representation 404*a* is currently speaking, and thus in response to detecting the audio from the user, the user representation 404*a* is modified with a visual animation 406 to show that the user is in an active audio state.

As mentioned above, the user representation 404*c* represents the user 204, i.e., a user that is local to the client device 102 and that is participating in the communication session 210. In at least some implementations, the user representation 404*c* is selectable to manipulate various audio related properties pertaining to the communication session 210. For instance, the user 204 can select the user representation 404*c* and manipulate the user representation 404*c* to adjust the volume of the communication session 210 at the client device 102 and/or at one or more devices for other participants in the communication session 210. The user 204, for example, can tap on the user representation 404*c* to activate its audio adjustment functionality, and can then rotate the user representation 404*c* clockwise to increase the output audio volume of the communication session 210 at the client device 102, or counterclockwise to decrease the volume. In at least some implementations, adjusting the volume may adjust the volume as output locally on the client device 102 and/or may adjust the output volume that is sent to other devices participating in the communication session 210.

When the volume property is adjusted, the user representation 404*c* may be animated to reflect the adjusted audio property. For instance, when the volume is increased, an animated ring 408 around the user representation 404*c* may increase in diameter to show the increase in audio volume. Further, when the volume is decreased, the animated ring 408 may decrease in diameter to show the decrease in audio volume. Thus, a user 204 may interact with the user representation 404*c* to change various audio properties, and the change in audio properties may be visually reflected in a visual attribute of the user representation 404*c*. Adjustment of audio volume is presented for purpose of example only, and various other audio properties may also be adjusted, such as tone, microphone sensitivity, noise reduction, various audio effects, and so forth. In at least some implementations, selecting a user representation causes an audio adjustment GUI to be presented that enables a user to adjust these and other properties of audio involved in the communication session.

Alternatively or additionally to adjusting the audio properties of the user 204, audio properties for other participants in the communication session 210 may be adjusted by interacting with their respective user representations. For instance, consider an example where the user 204 is having difficulty hearing a remote user represented by the user representation 404*b* and that is speaking during the communication session 210. Accordingly, the user 204 can tap on the user representation 404*b* and manipulate the user representation 404*b* to increase the output audio volume for the respective user at the client device 102. As with the user representation 404*c*, various other audio properties of the user associated with the user representation 404*b* may also be adjusted via interaction with the user representation 404*b*. In at least some implementations, when an audio property of a remote user is adjusted, their respective user representation may be visually animated to show the change in the audio property.

In at least some implementations, interaction by the user 204 with the user representation 404*c* causes a change in visual property for the user representation 404*c* as displayed at one or more remote devices participating in the communication session 210. For instance, consider that the user 204 provides input to the user representation 404*c*. The user 204, for example, provides a gesture to the user representation 404*c*, such as a press and hold gesture with the user's finger on the user representation 404*c*. According to various implementations, this user interaction with the user representation 404*c* causes an emphasis of the users voice and/or a custom visual pattern to be pushed to the user representation 404*c* as displayed on one or more devices that are participating in the communication session 210 and that are remote from the client device 102.

The communication GUI 402 further includes the disconnect control 304, the share control 218, and a minimize control 410. As mention above, the disconnect control 304 is selectable to disconnect the user 204 from the communication session 210. The share control 218 is selectable to enable the user 204 to send a text message to other participants (all or a subset of participants) in the communication session 210. The minimize control 410 is selectable to cause the size of the communication GUI 402 to be reduced, or the communication GUI 402 to be replaced with a different interface for the communication session 210. For instance, selecting the minimize control 410 causes the communication GUI 402 to be replaced with the session notification 208 and while the communication session 210 remains active and in progress. In an example implementation, selecting the minimize control 410 causes the communication GUI 402 to be removed and the session notification 208 to be presented in the context of the application GUI 202 and while the communication session 210 remains active, such as depicted in the scenario 300.

Accordingly, techniques discussed herein provide a portable communication experience where while a user is engaged in an activity in a first user experience, the user can view communication status of different users who are communicating via a second user experience. From within the context of the first user experience, the user may select to begin participating in a communication session with the different users via the second user experience. In at least some implementations, the first and second user experiences represent different respective applications that are separately and individually executable to provide different user experiences.

Having discussed some example implementation scenarios, consider now a discussion of some example procedures in accordance with one or more implementations.

The following discussion describes some example procedures for indication of communication across applications in a different user experience in accordance with one or more implementations. The example procedures may be employed in the environment 100 of FIG. 1, the system 900 of FIG. 9, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102) and/or at a network-based service, such as the communication service 120.

Figure 5:
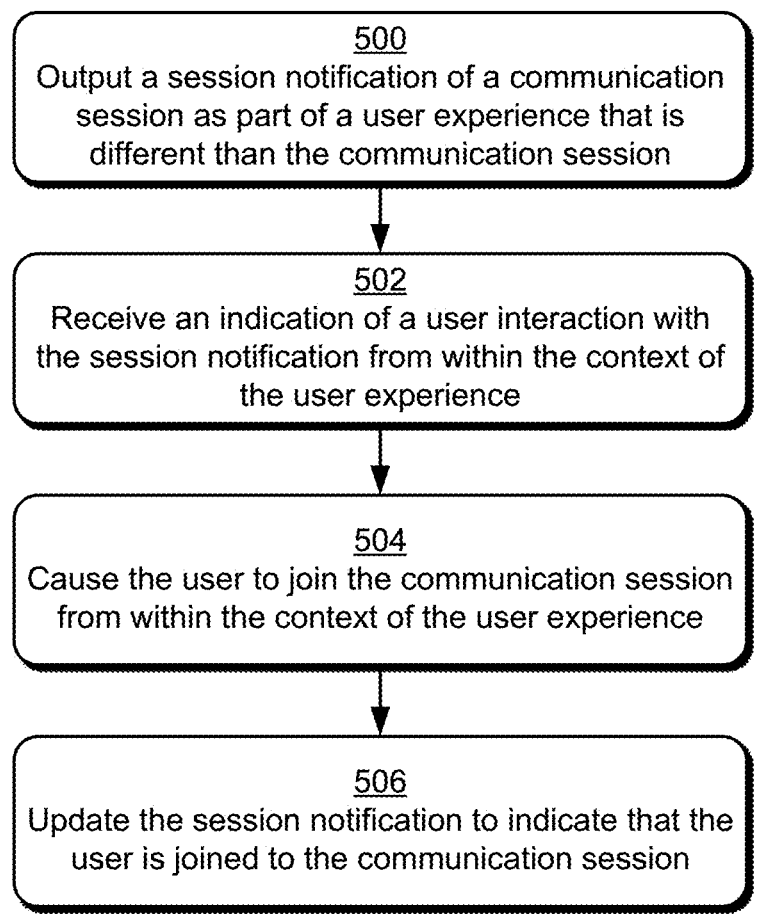
FIG. 5 is a flow diagram that describes steps in a method for enabling a user to view communication session status and initiate participation in a communication session in accordance with one or more implementations.

FIG. 5 is a flow diagram that describes steps in a method in accordance with one or more implementations. The method, for instance, describes an example procedure for enabling a user to view communication session status and initiate participation in a communication session across a variety of different user experiences.

Step 500 outputs a session notification of a communication session as part of a user experience that is different than the communication session. The communication client 110, for instance, outputs a visual indication of an active communication session within a GUI for a different user experience, such as a GUI for one of the applications 108. For example, the visual indication identifies one or more users that are participating in the communication session, such as via respective audio icons for the users. In at least some implementations, the user to whom the GUI for the different user experience is output is not currently a participant in the communication session, e.g., is not authenticated for participation in the communication session. For instance, as used herein, the term "participant" refers to a user who is authenticated for access to a communication session, and who is joined to the communication session.

Step 502 receives an indication of a user interaction with the session notification from within the context of the user experience. The user, for instance, provides input that indicates a request to join the communication session.

Step 504 causes the user to join the communication session from within the context of the user experience. The user, for instance, is joined to the communication session such that the user may begin exchanging audio, video, and/or other types of media with other participants in the communication session. In at least some implementations, a permission process is implemented that queries whether the user is permitted to join the communication session, and a decision whether to allow the user to join the communication session is subject to such permission.

Step 506 updates the session notification to indicate that the user is joined to the communication session. The session notification, for instance, is updated to include a user visualization that represents the user and indicates that the user is now a participant in the communication session.

Figure 6:
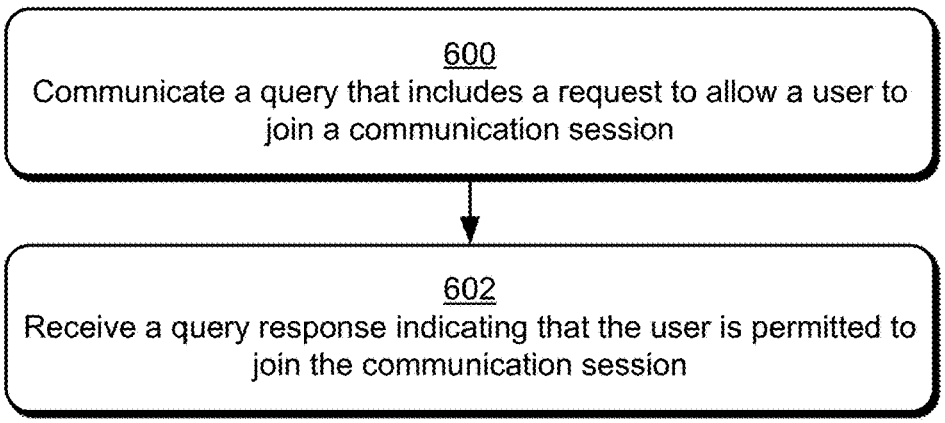
FIG. 6 is a flow diagram that describes steps in a method for querying whether a user is permitted to join a communication session in accordance with one or more implementations.

FIG. 6 is a flow diagram that describes steps in a method in accordance with one or more implementations. The method, for instance, describes an example procedure for querying whether a user is permitted to join a communication session.

Step 600 communicates a query that includes a request to allow a user to join a communication session. For example, in response to the user providing input to a session notification to request to join the communication session, an entity involved in the communication session is queried for whether the user is permitted to join the communication session. In at least some implementations, the communication client 110 communicates the query. A participant in the communication session and/or a managing entity (e.g., the communication service 120), for instance, can be queried with a request to permit the user to join the communication session.

Step 602 receives a query response indicating that the user is permitted to join the communication session. The communication client 110, for instance, receives the query response, such as from the communication service 120 and/or from a participant in the communication session. The user is then joined as a participant in the communication session.

Alternatively, the query response may indicate that the user is not permitted to join the communication session. Thus, the user may be denied permission to participate in the communication session such that the user cannot access communication media of the communication session.

Figure 7:
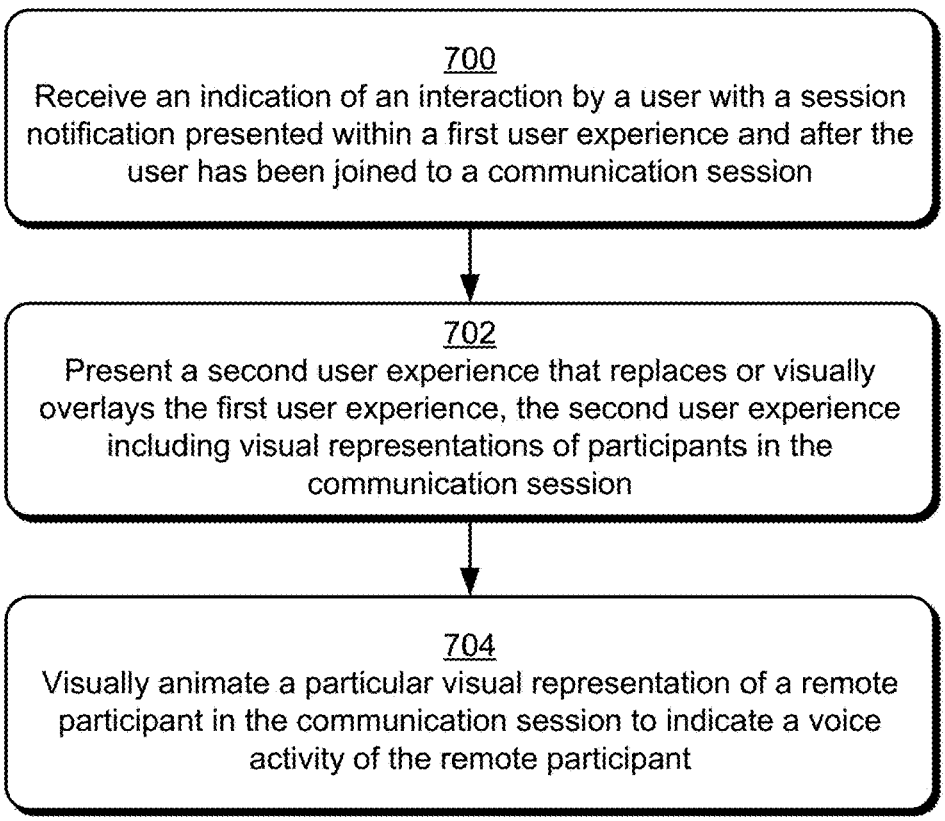
FIG. 7 is a flow diagram that describes steps in a method for transitioning a user experience for a communication session in accordance with one or more implementations.

FIG. 7 is a flow diagram that describes steps in a method in accordance with one or more implementations. The method, for instance, describes an example procedure for transitioning a user experience for a communication session.

Step 700 receives an indication of an interaction by a user with a session notification presented within a first user experience and after the user has been joined to a communication session. The user interaction, for instance, represents a further user interaction that occurs after the user has initially interacted with the session notification and been joined to the communication session.

Step 702 presents a second user experience that replaces or visually overlays the first user experience, the second user experience including visual representations of participants in the communication session. The session notification, for example, is replaced with a communication GUI for the communication client 110. Further, the communication GUI is populated with visualizations of different participants (including the user) in the communication session. Generally, each visualization can be implemented in various ways, such as live video feed, a captured image of a participant, a static visual representation, and so forth.

Step 704 visually animates a particular visual representation of a remote participant in the communication session to indicate a voice activity of the remote participant. An animated visual effect, for instance, is applied to the particular visual representation to indicate that the remote participant is speaking as part of the communication session.

Thus, implementations for notification of a communication session in a different user experience discussed herein enable communication status to be surfaced across a variety of different experiences and enable users to initiate participation in communication sessions from within a variety of different user experiences.

Having discussed some example procedures, consider now a discussion of an example system and device in accordance with one or more implementations.

Figure 8:
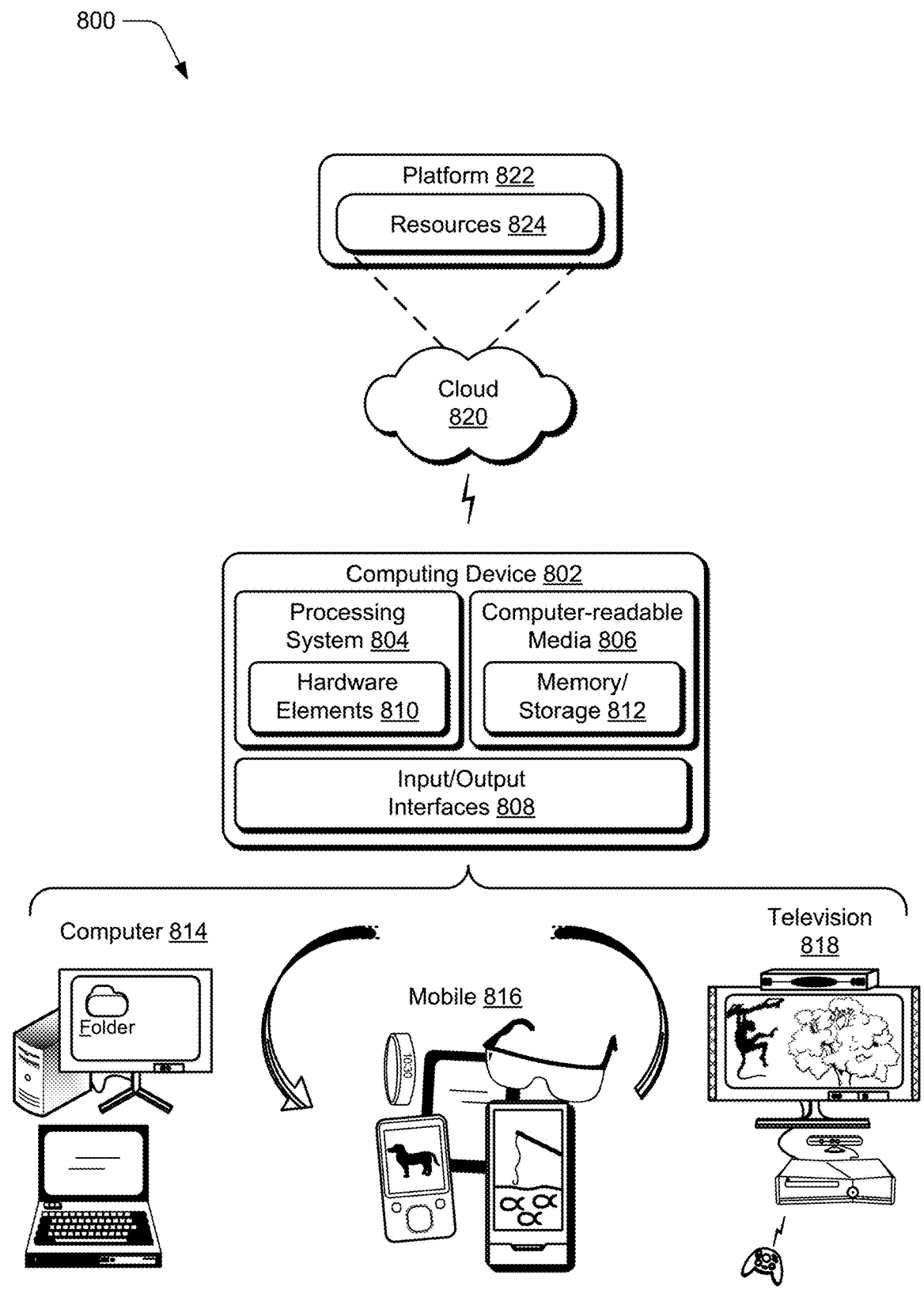
FIG. 8 illustrates an example system and computing device as described with reference to FIG. 1, which are configured to implement implementations of techniques described herein.

FIG. 8 illustrates an example system generally at 800 that includes an example computing device 802 that is representative of one or more computing systems and/or devices that may implement various techniques described herein. For example, the client device 102, the endpoint device 116, and/or the communication service 120 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another.

A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the communication client 110 and/or the communication service 120 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device implementation, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 80.

Techniques for indication of communication across applications in a different user experience are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

Generally, implementations discussed herein include a system for enabling a user to join a communication session from within the context of a different user experience, the system including: one or more processors; and one or more computer-readable storage media storing instructions that are executable by the one or more processors to perform operations including: outputting a session notification of a communication session as part of a user experience that is different than the communication session, the user experience involving a user that is not currently a participant in the communication session; receiving an indication of a user interaction with the session notification from within the context of the user experience; and causing the user to join the communication session from within the context of the user experience.

In addition to the system described above, implementations include: wherein the communication session is implemented via a first application, and the user experience includes a second application different than the first application; wherein the user experience includes a text chat experience, and the communication session includes a real-time exchange of voice media; wherein the session notification includes a representation of a different user that is a participant in the communication session but is not a participant in the user experience; wherein the session notification is a visual representation of a communication object that is embedded within the user experience; wherein the session notification is a visual representation of a communication object that is embedded within the user experience, and wherein the communication object is controlled by a communication client that manages the communication session; wherein the session notification is a visual representation of a communication object that is embedded within the user experience, and wherein the communication object is portable such that the communication object is embeddable in multiple different user experiences; wherein said causing the user to join the communication session includes: communicating a query that includes a request to allow the user to join the communication session; and receiving a query response indicating that the user is permitted to join the communication session; wherein the user is joined to the communication session such that the user is enabled to, from within the context of the user experience, concurrently participate in the communication session and interact with the user experience; wherein the session notification includes visual representations of different participants in the communication session, and wherein the operations further include, based on the user joining the communication session, updating the session notification to include a visual representation of the user; wherein the operations further include: presenting a different user experience that replaces or visually overlays the user experience, the different user experience including visual representations of participants in the communication session; and visually animating a particular visual representation of a remote participant in the communication session to indicate a voice activity of the remote participant; wherein the operations further include: receiving an indication of a further user interaction with the session notification after the user has been joined to the communication session; and presenting a different user experience that replaces or visually overlays the user experience, the different user experience including visual representations of participants in the communication session.

Implementations further include a method for enabling a user to join a communication session from within the context of a different user experience, the method including: outputting a session notification of a communication session as part of a user experience that is different than communication session; receiving an indication of an interaction by a user with the session notification from within the context of the user experience; causing the user to join the communication session from within the context of the user experience; and updating the session notification to indicate that the user is joined to the communication session.

In addition to the method described above, implementations discussed herein further include: wherein said outputting includes outputting a visual representation of a participant in the communication session that is not a participant in the user experience; wherein said outputting includes outputting a visual representation of a participant in the communication session, and wherein the method further includes visually animating the visual representation to indicate a voice activity of the participant; wherein said outputting includes visually binding the session notification to a graphical user interface (GUI) of the user experience; further including: receiving an indication of a further user interaction with the session notification after the user has been joined to the communication session; and presenting a different user experience that replaces or visually overlays the user experience, the different user experience including visual representations of participants in the communication session.

Implementations discussed herein include a method for enabling a user to join a communication session from within the context of a different user experience, the method including: outputting a session notification of a communication session as part of a user experience that is different than the communication session, the user experience involving a user that is not currently a participant in the communication session; receiving an indication of a user interaction with the session notification from within the context of the user experience; and causing the user to join the communication session from within the context of the user experience.

In addition to the method described above, implementations discussed herein include: further including displaying at least some content of the communication session within the session notification and prior to the user joining the communication session; further including: receiving an indication of a further user interaction with the session notification after the user has been joined to the communication session; and presenting a different user experience that replaces or visually overlays the user experience, the different user experience including visual representations of participants in the communication session.

What is claimed is:

1. A device comprising:
a processor; and
a memory in communication with the processor, the memory comprising executable instructions that, when executed by the processor, cause the processor to control the device to perform functions of:
displaying, via a first graphical user interface (GUI) for a first application, content of a first communication session between a first person and a second person, wherein the first person is a user of the device and the first communication session is carried out by the first application;
displaying, via the first GUI for the first application, an indication of a second communication session between the first and second persons, wherein the second communication session is carried out by a second application;
receiving, via the first GUI for the first application, a user input to display the second communication session carried out by the second application; and
in response to the received user input, displaying, via the first GUI for the first application, content of the second communication session carried out by the second application.

2. The device of claim 1, wherein the instructions, when executed by the processor, further cause the processor to control the device to display, via the first GUI for the first application, an indication of the first communication session between the first and second persons via the first application.

3. The device of claim 1, wherein the instructions, when executed by the processor, further cause the processor to control the device to perform functions of:
operating the first application to enable the first communication session via a first communication modality; and
operating the second application to enable the second communication session via a second communication modality that is different from the first communication modality.

4. The device of claim 1, wherein the instructions, when executed by the processor, further cause the processor to control the device to perform a function of displaying, via the first GUI for the first application, a session notification indicating that the second person and a third person are participating in a third communication session in which the first person is not participating.

5. The device of claim 1, wherein, for displaying, via the first GUI for the first application, the indication of the second communication session carried out by the second application, the instructions, when executed by the processor, cause the processor to control the device to perform a function of displaying, via the first GUI for the first application, a communication object indicating the second communication session carried out by the second application.

6. The device of claim 5, wherein the communication object is portable so as to be embeddable in multiple different graphical user interfaces for multiple different applications.

7. The device of claim 1, wherein, for displaying, via the first GUI for the first application, the indication of the second communication session carried out by the second application, the instructions, when executed by the processor, cause the processor to control the device to perform functions of:
receiving the indication of the second communication session carried out by the second application; and
presenting, via the first GUI for the first application, a visual indication of the second communication session carried out by the second application.

8. The device of claim 1, wherein the instructions, when executed by the processor, further cause the processor to control the device to perform a function of enabling the first person to participate, via the first GUI for the first application, in the second communication session carried out by the second application.

9. The device of claim 1, wherein, for displaying, via the first GUI for the first application, the indication of the second communication session carried out by the second application, the instructions, when executed by the processor, cause the processor to control the device to perform functions of:
presenting, via the first GUI for the first application, a visual representation of the second person; and
visually animating, via the first GUI for the first application, the visual representation to indicate a voice activity of the second person.

10. The device of claim 1, wherein the instructions, when executed by the processor, further cause the processor to control the device to perform functions of:
receiving, via the first GUI for the first application, another user input by the first person instructing the first application to initiate communication with the second person via a second GUI for the second application; and
generating the second GUI for the second application that replaces or visually overlays the first GUI for the first application to enable the first person to communicate with the second person via the second GUI for the second application.

11. A method of operating a device, comprising:
displaying, via a first graphical user interface (GUI) for a first application, content of a first communication session between first and second persons, wherein the first person is a user of the device and the first communication session is carried out by the first application;
displaying, via the first GUI for the first application, an indication of a second communication session between the first and second persons, wherein the second communication session is carried out by a second application;
receiving, via the first GUI for the first application, a user input to display the second communication session carried out by the second application; and
in response to the received user input, displaying, via the first GUI for the first application, content of the second communication session carried out by the second application.

12. The method of claim 11, further comprising displaying, via the first GUI for the first application, the indication of the first communication session between the first and second persons via the first application.

13. The method of claim 11, further comprising:
operating the first application to enable the first communication session via a first communication modality; and
operating the second application to enable the second communication session via a second communication modality that is different from the first communication modality.

14. The method of claim 11, further comprising displaying, via the first GUI for the first application, a session notification indicating that the second person and a third person are participating in a communication session in which the first person is not participating.

15. The method of claim 11, wherein displaying, via the first GUI for the first application, the indication of the second communication session carried out by b the second application comprises displaying, via the first GUI for the first application, a communication object indicating the second communication session.

16. The method of claim 11, wherein displaying, via the first GUI for the first application, the indication of the second communication session carried out by the second application comprises:
receiving the indication of the second communication session carried out by the second application; and
presenting, via the first GUI for the first application, a visual indication of the second communication session.

17. The method of claim 11, further comprising enabling the first person to participate, via the first GUI for the first application, in the second communication session carried out by the second application.

18. The method of claim 11, wherein displaying, via the first GUI for the first application, the indication of the second communication session carried out by the second application comprises:
presenting, via the first GUI for the first application, a visual representation of the second person; and
visually animating, via the first GUI for the first application, the visual representation to indicate a voice activity of the second person.

19. The method of claim 11, further comprising:
receiving, via the first GUI for the first application, another user input by the first person instructing the first application to initiate communication with the second person via a second GUI for the second application; and
generating the second GUI for the second application that replaces or visually overlays the first GUI for the first application to enable the first person to communicate with the second person via the second GUI for the second application.

20. A non-transitory computer readable medium containing instructions for causing a device to perform functions of:
displaying, via a first graphical user interface (GUI) for a first application, content of a first communication session between first and second persons, wherein the first person is a user of the device and the first communication session is carried out by the first application;

displaying, via the first GUI for the first application, an indication of a second communication session between the first and second persons, wherein the second communication session is carried out by a second application;
receiving, via the first GUI for the first application, a user input to display the second communication session between the first and second persons within the second application; and
in response to the received user input, displaying, via the first GUI for the first application, content of the second communication session.

* * * * *